Patented Aug. 7, 1923.

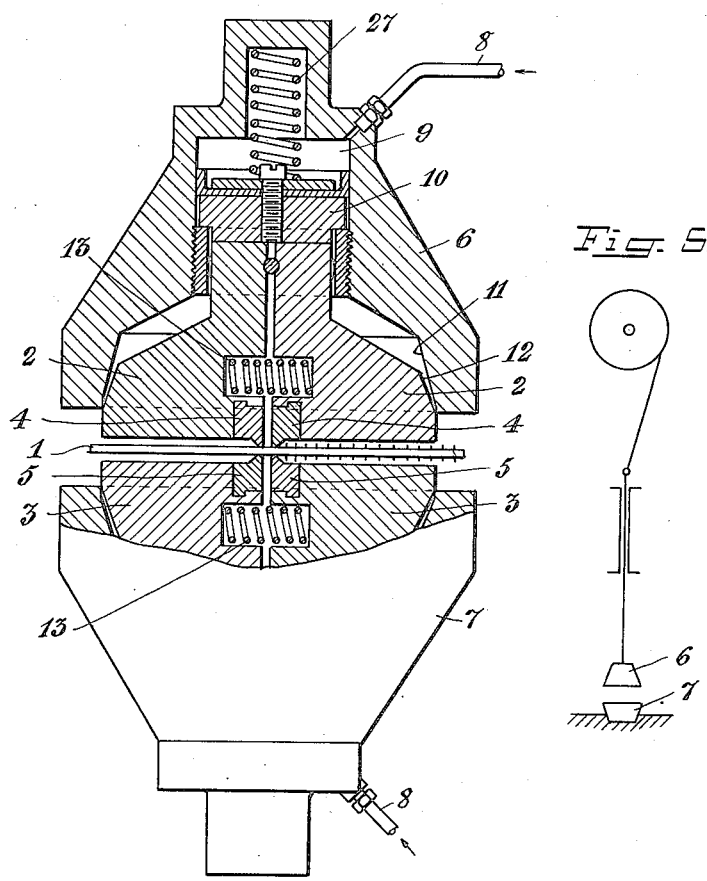

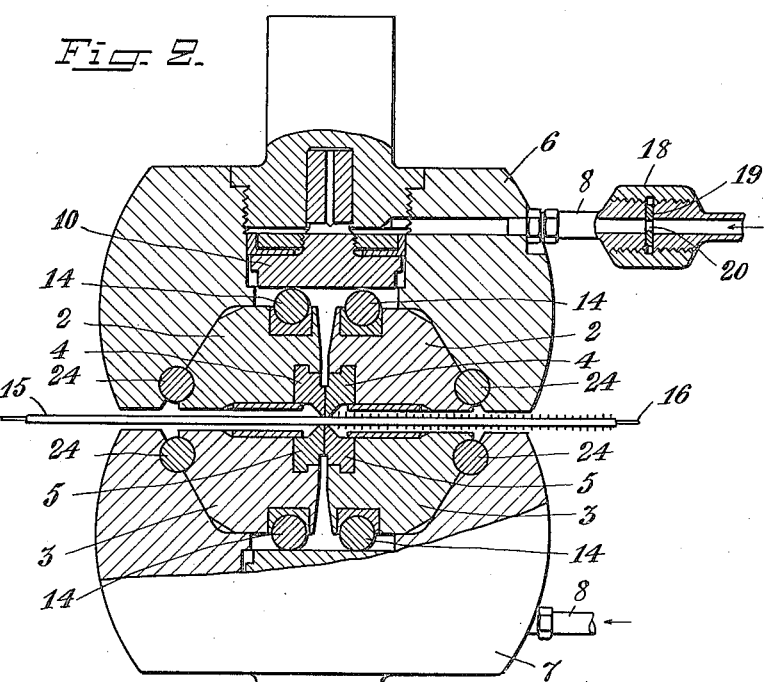

1,464,434

UNITED STATES PATENT OFFICE.

FREDRIK LJUNGSTRÖM, OF BREVIK, LIDINGON, SWEDEN, ASSIGNOR TO AKTIEBOLAGET LJUNGSTROMS ANGTURBIN, OF STOCKHOLM, SWEDEN, A CORPORATION.

METHOD AND APPARATUS FOR MANUFACTURE OF FLANGES ON PLATES.

Application filed March 18, 1921. Serial No. 453,526.

*To all whom it may concern:*

Be it known that I, FREDRIK LJUNGSTRÖM, chief engineer, subject of the King of Sweden, residing at Brevik, Lidingon, Sweden, have invented certain new and useful Improvements in the Method and Apparatus for Manufacture of Flanges on Plates, of which the following is a specification.

This invention relates to improvements in the manufacture of projecting ribs or flanges on plates or the like, particularly cooling elements for instance consisting of flattened pipes. The invention consists in that the ribs or flanges are formed by means of two jaws movable towards and from each other and the plate and then forced together.

A device by the aid of which this manufacture may be effected is illustrated in the accompanying drawings in which Fig. 1 is a partial vertical section of an apparatus adapted for the said purpose, Fig. 2 is a partial vertical section of a modified embodiment of the apparatus. Fig. 3 is a detailed view of the edges of the jaws when being depressed in the plate of the work piece. Fig. 4 is a plan view of the lowermost one of the two jaws co-operating in pairs. Fig. 5 is a diagrammatic view of an eccentric press adapted to be used for the manufacture. Fig. 6 shows on a larger scale a part of a flattened pipe used as the work piece and a rail inserted in said pipe.

Referring to the embodiments shown in Fig. 1, 1 is the plate to be provided with ribs or flanges. Said plate which in this case is to be provided with parallel ribs or flanges on both sides is fed forward between two pairs of co-operating jaws consisting of two upper jaws 2 and two lower jaws 3, provided with edges 4 and 5 respectively. Each pair of jaws is inserted in a casing 6 and 7 respectively, actuating the jaws, the jaws being first caused by the casings to perform a parallel motion towards the plate, thus forming a projection or lug on the plate between the latter and the edges of the jaws, the jaws then being forced together so as to press the projection to form a rib or flange. To effect said first-named movement of the jaws a spring 27 is preferably inserted between the same and the casing and so adjusted that the edges of the jaws will be sufficiently forced down into the plate, before the jaws are brought together. For the spring may be substituted a cushion of liquid, air or gas arranged between the jaws and the casing. Such an arrangement may preferably be so devised that the pressure medium is admitted through the conduits 8 into a bore 9 in the casing and caused to actuate in the manner desired a piston 10 connected with the jaws. The pressure exerted by the spring 27 or the pressure medium may, as mentioned above, be of such a force that the jaws are pressed down sufficiently into the plate but may also exceed this pressure, in which case abutments on the jaws or the casing determine the extent to which the edges are to be forced into the plate, before the jaws by being forced into the casing are caused by means of the conical surfaces 11 and 12 to be brought together and thus to press together the material lying between them.

Between the jaws of each pair of jaws springs 13 may preferably be inserted.

In the embodiment illustrated in Fig. 2 showing contrary to Fig. 1 the parts in their positions while pressing the projections or lugs together the alteration is made that the jaws 2 and 3, while being forced into the casings 6 and 7 1 pectively, are turned about pins 24, pins 14 being adapted to slide on the pistons 10. Balls or other abutting members may be substituted for said pins. Also in this case the pressure conduits 8 effects the determined pressure above the piston 10. The edges 4 and 5 of the jaws are thereby forced into the work piece which in this case consists of a flattened pipe 15 having inserted therein a rail 16 (Fig. 6), until abutments force the jaws into the casings. In this case these abutments consist of rollers 17 placed on the jaws 3 of the lower tool, said rollers preventing by the contact with the jaws 2 of the upper tool the jaws of the two tools from further advance, and at the same time limiting the penetration of the edges of the jaws into the work piece. As the two outer casings approach each other and the work piece, the jaws are forced into the casings while turning about the pins 24, the jaws thereby being forced together and the rib pressed up. Consequently according to the present invention the projections or lugs are obtained by depression of the intermediate material, the projections thus formed being pressed together so as to form flanges.

Preferably the tools above mentioned are placed in an eccentric press, the projections being produced and pressed together to flanges in one stroke of the eccentric press, so that it appears as if the ribs were pressed out directly from the relatively smooth plate.

When placing the apparatus in the eccentric press indicated in Fig. 5, the arrangement is taken that the greatest movement of the jaws is effected when pressing down the edges of the jaws into the plate and at the moment when the greatest counter-pressure in the chamber above the piston 10 is needed said movement decreasing at the commencement of the operation, for pressing up the ribs when a less counter-pressure is necessary. Thus the great counter-pressure, which only in part is needed, does not occur during the whole operation, the stresses and the yielding action caused thereby being reduced. The said controlling of the counter-pressure may be effected by suitable throttling of the opening in the supply conduit 8. To this purpose the conduit 8 in the embodiment shown in Fig. 2 is provided with a screw sleeve 18 in which a reducing plate 19 is inserted and provided with a small opening 20, the magnitude of which is adjusted according to the counter-pressure desired above the piston 10. Of course, the counter-pressure desired may also be obtained by suitable sizing of the conduit 8 which, however, is very difficult, since the section of passage has to be exactly calculated and adjusted. By changing the reducing plates having different sections of passage the counter-pressure may be adjusted according to the material of the work piece.

Fig. 3 illustrates the positions of the edges when being forced into the plate or the casing, or in other words before the jaws are turned about the pins 24.

When pressing up flanges on elements consisting of flattened pipes, it has appeared that flaws and buckles will be formed in front of the tool on the side where ribs have not yet been pressed up. To prevent this drawback the tool may at this side be provided with abutments 21 which during the operation are pressed simultaneously against the plate thus preventing the deformation of the plate by buckling. Preferably said abutments 21 should not reach the edges 4 and 5 but bear against the edge, as shown in Fig. 3, close inside the same, thus allowing the edges 4 and 5 to be properly pressed down into the plate.

What I claim as new and desire to secure by Letters Patent of the United States is:—

1. Process of producing ribs or flanges on plates or the like, as for instance on cooling elements, characterized by the ribs or flanges being formed by means of two jaws movable towards and from each other and the plate, the jaws first being pressed into the plate in one direction and then forced together in another direction.

2. A process according to claim 1 applied to both outer sides of the plate and further characterized by ribs or flanges being pressed up at said both sides simultaneously.

3. A process according to claim 1 characterized by the ribs or flanges being formed in parallel to one another.

4. A process according to claim 1 and further characterized by the ribs or flanges being made on flattened pipes into which a rail or the like is inserted.

5. An apparatus for performing the process set forth in claim 1, characterized by two jaws movable towards and from each other and the plate in such manner that the jaws first perform a parallel motion towards the plate and then a motion towards each other.

6. An apparatus according to claim 5 characterized by the jaws being located in a casing actuating said jaws, a yielding device being interposed between the jaws and the casing in such manner that the movement of the jaws towards each other is effected after their depression into the plate.

7. An apparatus according to claim 5 and having a cushion of liquid placed between the jaws and the casing, characterized by the supply or outlet conduit (8) of the cushion of liquid being provided with an adjustable throttling device.

8. An apparatus according to claim 7, characterized by the throttling device consisting of a plate or the like changeably inserted in the conduit by means of a screw sleeve or the like or in any other suitable manner, the plate being provided with an outlet opening corresponding to the counter-pressure desired.

9. An apparatus according to claim 5 characterized by at least one of two jaws situated opposite each other at either side of the workpiece being provided with an abutment so arranged as to be pressed against the workpiece upon the forcing of the jaws towards each other.

In testimony whereof I affix my signature in presence of two witnesses.

FREDRIK LJUNGSTRÖM.

Witnesses:
  Snez Swenson,
  William L. Peck.